US011477193B2

(12) United States Patent
Yang (10) Patent No.: US 11,477,193 B2
(45) Date of Patent: Oct. 18, 2022

(54) USER PERMISSION MANAGEMENT SYSTEM AND METHOD (71) Applicant: GOOD WAY TECHNOLOGY CO., LTD., New Taipei (TW)

(72) Inventor: Chang-Chieh Yang, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 346 days.

(21) Appl. No.: 16/665,081

(22) Filed: Oct. 28, 2019

(65) Prior Publication Data
US 2021/0126914 A1    Apr. 29, 2021

(51) Int. Cl.
*H04L 9/40* (2022.01)
*G06F 1/16* (2006.01)

(52) U.S. Cl.
CPC ........ *H04L 63/0876* (2013.01); *G06F 1/1632* (2013.01); *H04L 63/102* (2013.01)

(58) Field of Classification Search
CPC ... H04L 63/0876; H04L 63/102; H04L 63/20; H04L 63/105; G06F 1/1632
See application file for complete search history.

(56) References Cited

U.S. PATENT DOCUMENTS 7,095,854 B1 *   8/2006   Ginter .............. H04N 21/25816
                                                         380/231
2020/0053090 A1 *   2/2020   Kliger .................... G06N 20/00

* cited by examiner

Primary Examiner — Khoi V Le
(74) Attorney, Agent, or Firm — Li & Cai Intellectual Property (USA) Office (57) ABSTRACT A user permission management system and a method thereof are provided, which are suitable for assigning permission to one or more user devices. The system includes one or more docking stations and a management information device. Each user device is connected to the docking station. Each docking station is configured to transmit user identification information from the user devices to the management information device. The management information device is connected to the one or more docking stations and stores a user permission database. The management information device is configured to look up a user identity corresponding to the user identification information of the user device and permission of the user identity from the user permission database. The docking station assigns the permission to the user device to use network resources.

8 Claims, 5 Drawing Sheets

USER PERMISSION MANAGEMENT SYSTEM AND METHOD

FIELD OF THE DISCLOSURE

The present disclosure relates to a management system and a method thereof, and more particularly to a user permission management system and a method thereof.

BACKGROUND OF THE DISCLOSURE

With the development of network technologies, networks have become an indispensable part of people's daily lives. For example, networks can include a local area network such as a home network for domestic use, or an enterprise network for corporate use. How different users of a local area network can be distinguished and assigned with different permissions has become an important issue. For example, different permissions in an enterprise network can be assigned to different users such as an employer, an administrator and employees.

SUMMARY OF THE DISCLOSURE

In response to the above-referenced technical inadequacies, the present disclosure provides a user permission management system, which is suitable for assigning permission to one or more user devices. The user permission management system includes one or more docking stations and a management information device. The docking station is connected to the user device and configured to transmit user identification information from the user device. The management information device is connected to the one or more docking stations. The management information device is configured to store a user permission database and search a user identity corresponding to the user identification information of the user device and permission of the user identity from the user permission database to control the docking station to assign the permission to the user device and to authorize the user device to use network resources corresponding to the permission of the user identity.

In certain embodiments, the management information device determines the permission of the user device according to the user identification information of the user device and docking identification information of the docking station.

In certain embodiments, the user permission management system further includes a first network switch. The first network switch is connected between the management information device and at least one of the docking stations. The first network switch is configured to allow the network resources to be transmitted between the management information device and the at least one docking station through a network.

In certain embodiments, the user permission management system further includes a second network switch. The second network switch is connected between the first network switch and the other docking stations. The first network switch and the second network switch are configured to allow the network resources to be transmitted between the management information device and the other docking stations through the network.

In certain embodiments, the user identification information includes an IP address or a MAC address of the user device.

In addition, the present disclosure provides a user permission management method, which is suitable for assigning permission to one or more user devices. The user permission management method includes the following steps: providing one or more docking stations, each docking station being connected to one of the user devices, and transmitting user identification information from the user device connected to the docking station; storing a user permission database by a management information device; searching a user identity corresponding to the user identification information and permission of the user identity in the user permission database by the management information device; and controlling the docking station, by the management information device, to assign the permission to the user device and to authorize the user device to use network resources corresponding to the permission of the user identity.

In certain embodiments, the user permission management method further includes a step of: determining the permission of the user device according to the user identification information of the user device and docking identification information of the docking station by the management information device.

In certain embodiments, the user permission management method further includes steps of: providing a first network switch connected between the management information device and at least one of the docking stations; and allowing the network resources to be transmitted between the management information device and the at least one docking station through a network by the first network switch.

In certain embodiments, the user permission management method further includes steps of: providing a second network switch connected between the first network switch and the other docking stations; and allowing the network resources to be transmitted between the management information device and the other docking stations through the network by the first network switch and the second network switch.

In certain embodiments, the user identification information includes an IP address or a MAC address of the user device.

As described above, the present disclosure provides the user permission management system and method, which use the docking stations to connect the user devices to the management information device. The docking station transmits the user identification information of the user device connected thereto to the management information device. The management information device determines whether or not the user identification information from the user device matches with the user identification information stored in the user permission database. If they match each other, the management information device assigns the network permission to the user device to use the network resources according to the user identification information in the user permission database. The management information device effectively manages accessing and using permissions of the network resources for the user devices intending to use the network.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
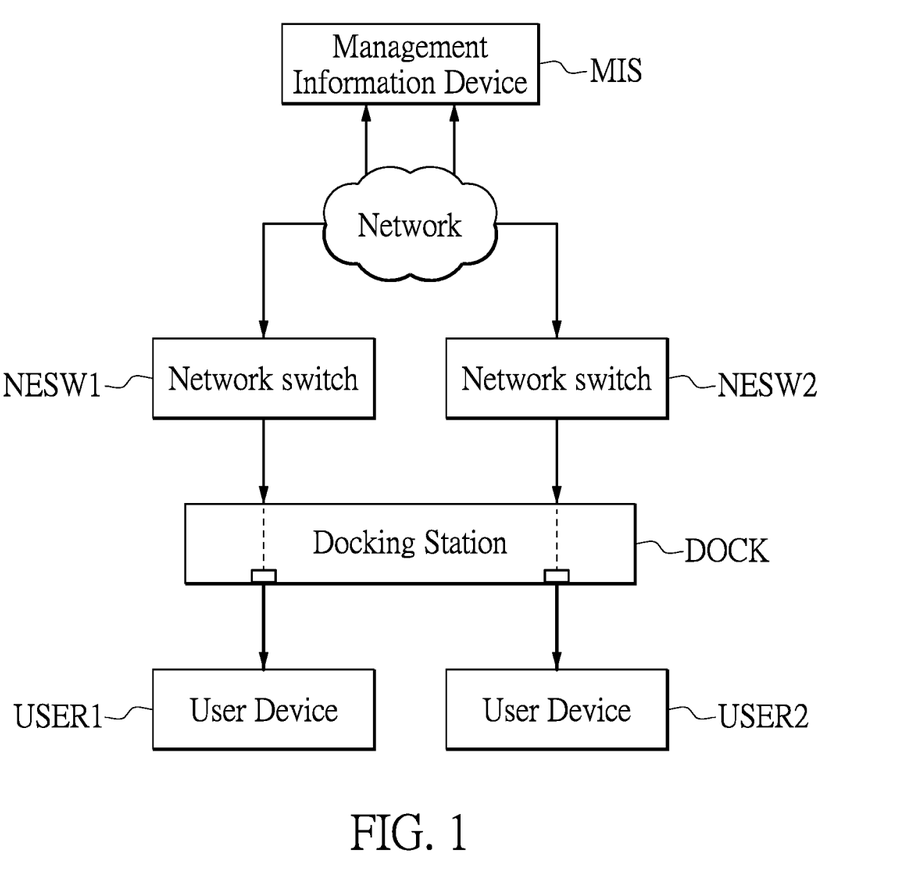
FIG. 1 is a block diagram of a user permission management system according to a first embodiment of the present disclosure.

Reference is made to FIG. 1, which is a block diagram of a user permission management system according to a first embodiment of the present disclosure. As shown in FIG. 1, in the first embodiment, a user permission management system 1 includes a docking station DOCK and a management information device MIS, and assigns permission such as a network access permission to one or more user devices such as user devices USER1 and USER2.

A common location for the docking station DOCK may be in a space such as an office space. Alternatively, a plurality of docking stations DOCK may be respectively disposed inside a plurality of subspaces such as meeting rooms, which are divided from the office space. The docking station DOCK may have a plurality of expansion slots.

Two terminals of a connector may be respectively inserted into a connection port of the user device USER1 or USER2 and the expansion slot of the docking station DOCK to electrically connect the user device USER1 or USER2 to the docking station DOCK. As shown in FIG. 1, in the embodiment, the docking station DOCK has two USB expansion slots and the user devices USER1 and USER2 both have a USB connection port, but those may be replaced with other types of expansion slots and other types of connection ports in practice, and the present disclosure is not limited thereto.

A management information device MIS may be connected to the docking station DOCK in a wireless manner and configured to control the docking station DOCK to manage network permission of the user devices USER1 and USER2. The management information device MIS may store a user permission database. The user permission database has user identities of the user devices USER1 and USER2 such as a visitor, a customer, a boss, a supervisor, an employee, and permission of the user identities, such as permission of accessing all webpages or only specified webpages.

If the user devices USER1 and USER2 intend to access a network to use network resources, the user devices USER1 and USER2 may be connected to the docking station DOCK through a wire. The docking station DOCK may obtain user identification information ID of the user devices USER1 and USER2 connected thereto. For example, the user identification information ID is a unique identification code, such as an IP address or a MAC address, of the user device USER1 or USER2, but the present disclosure is not limited thereto.

Network switches NESW1 and NESW2 may be disposed between the docking station DOCK and the management information device MIS. The docking station DOCK may transmit the user identification information ID of the user devices USER1 and USER2 to the management information device MIS respectively through the network switches NESW1 and NESW2.

The management information device MIS may search the user identities corresponding to the user identification information ID of the user devices USER1 and USER2 and the permission of the user identities from the stored user permission database, and accordingly control the docking station DOCK to assign the permission to the user devices USER1 and USER2 to use resources.

For example, the management information device MIS assigns network permission of downloading original files in a shared folder dedicated for a company to the user device USER1, but restricts the user device USER1 from modifying and deleting contents of the original files and from uploading new files. In contrast, the management information device MIS assigns network permission of uploading, downloading, modifying and deleting the original files or new files to the user device USER2.

Figure 2:
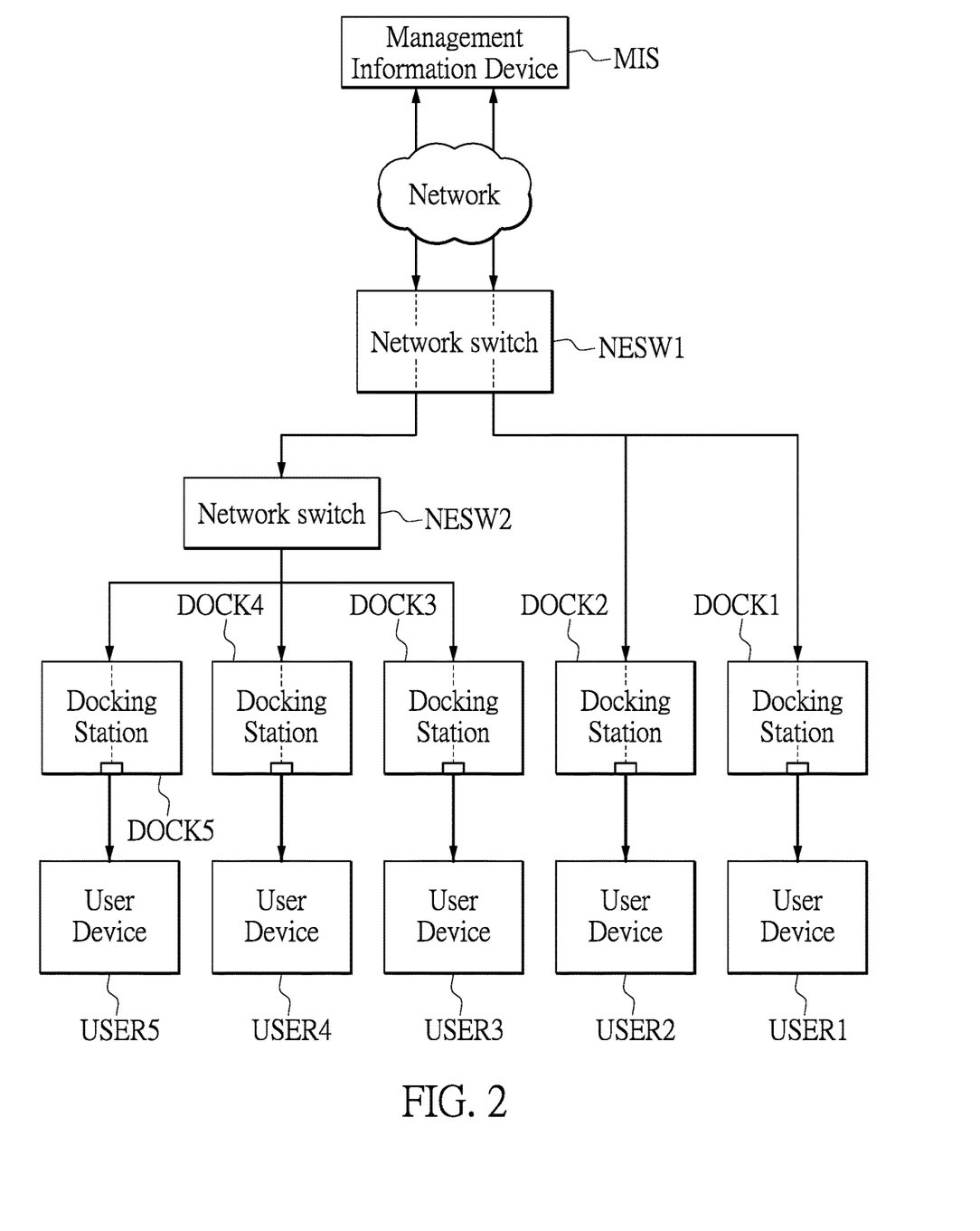
FIG. 2 is a block diagram of a user permission management system according to a second embodiment of the present disclosure.
Figure 3:
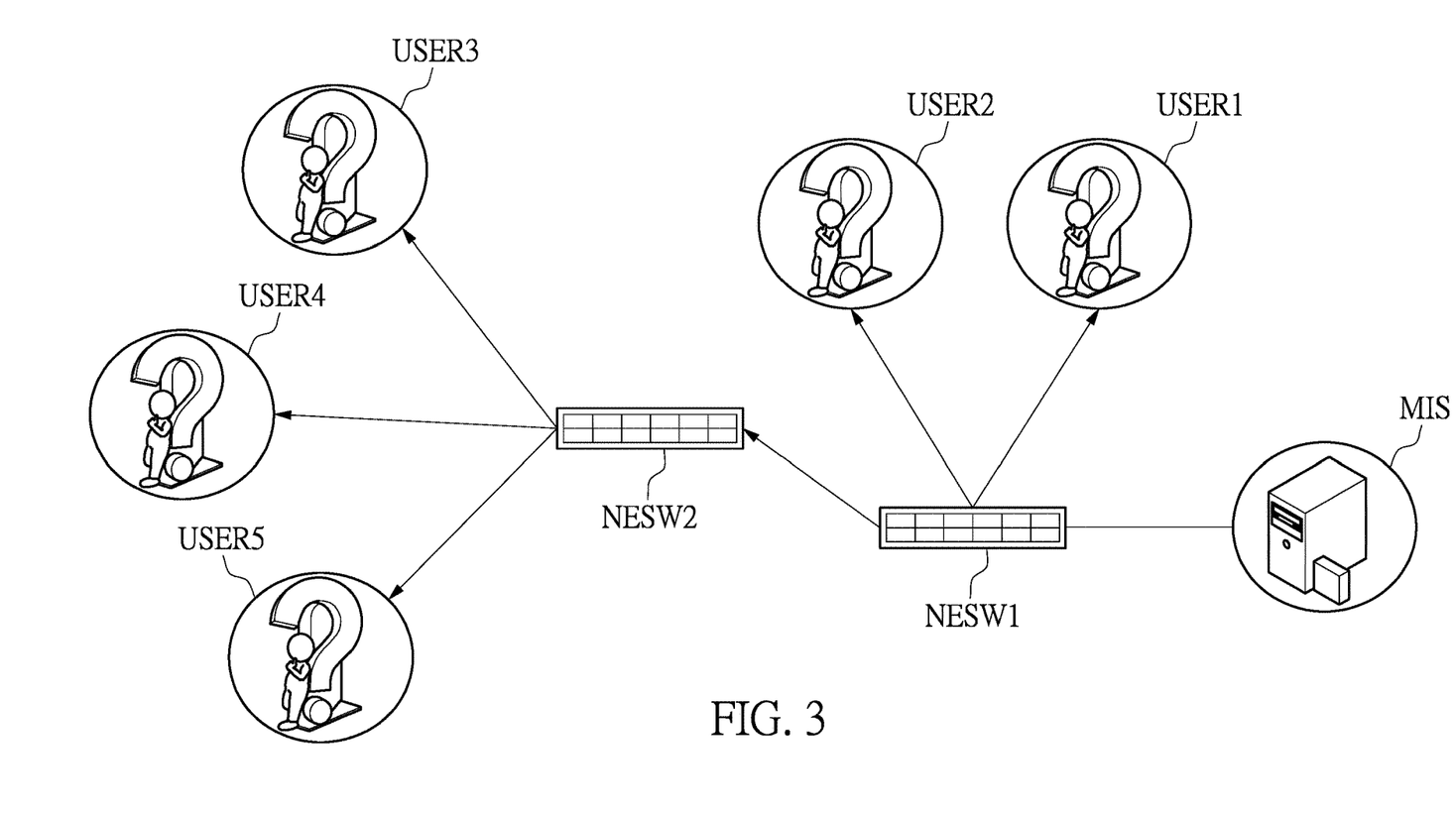
FIG. 3 is a schematic diagram of the user permission management system failing to identify a docking station and user devices according to the second embodiment of the present disclosure.
Figure 4:
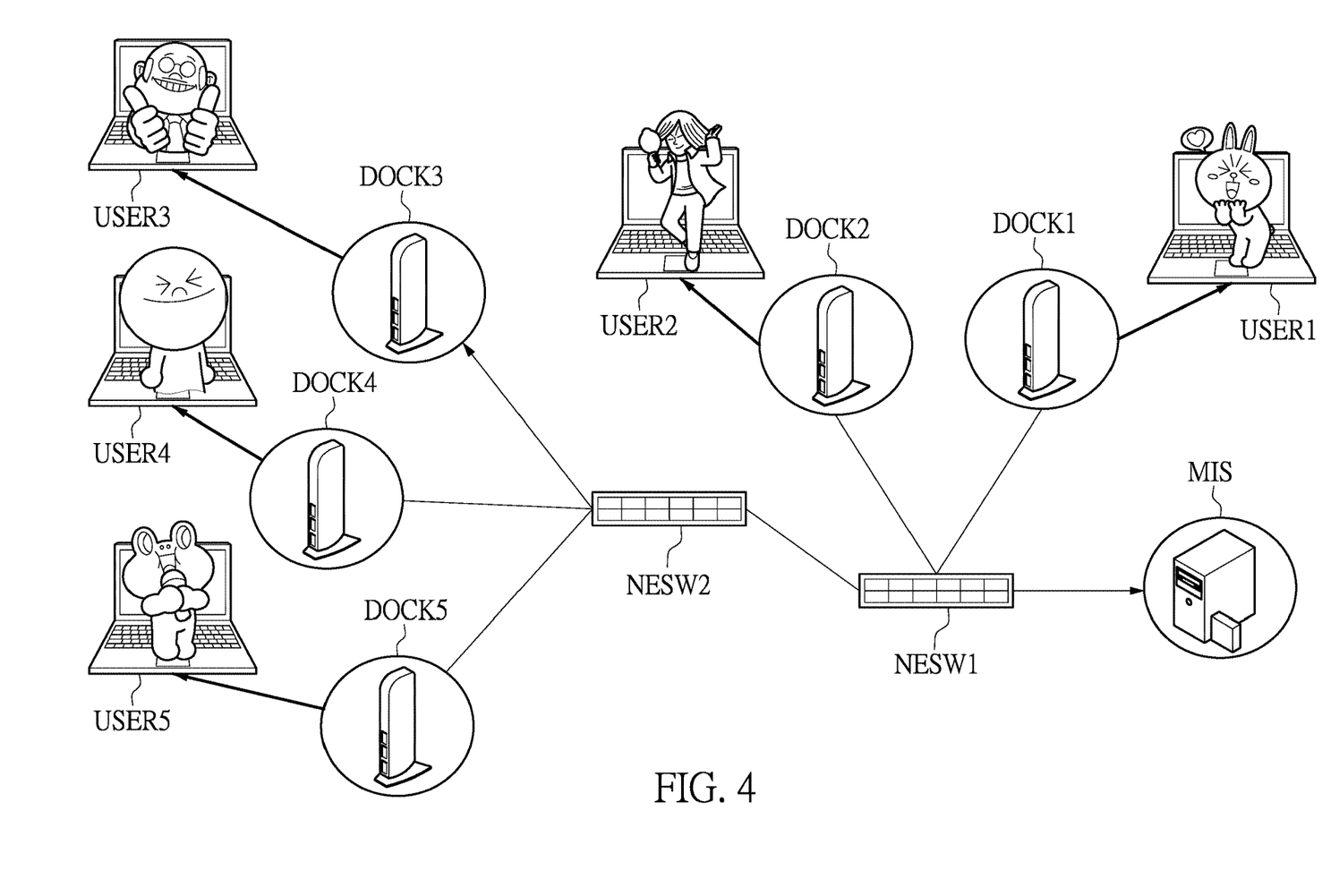
FIG. 4 is a schematic diagram of the user permission management system having authenticated identification information of the docking station and the user devices according to the second embodiment of the present disclosure.

Reference is made to FIGS. 2, 3 and 4, wherein FIG. 2 is a block diagram of a user permission management system according to a second embodiment of the present disclosure, FIG. 3 is a schematic diagram of the user permission management system failing to identify a docking station and user devices according to the second embodiment of the present disclosure, and FIG. 4 is a schematic diagram of the user permission management system having authenticated identification information of the docking station and the user devices according to the second embodiment of the present disclosure.

As shown in FIG. 2, in the second embodiment, the user permission management system includes a plurality of docking stations such as five docking stations DOCK1 to DOCK5 and the management information device MIS. The user permission management system is suitable for assigning permission to the user devices such as five user devices USER1 to USER5. The user devices USER1 to USER5 may be notebooks, mobile devices or other electronic devices, but the present disclosure is not limited thereto.

The user devices USER1 to USER5 may be connected respectively to the docking stations DOCK1 to DOCK5. The docking stations DOCK1 to DOCK5 may include detector modules, which are respectively used for detecting connection between the user devices USER1 to USER5 and the docking stations DOCK1 to DOCK5.

In the embodiment, each of the docking stations DOCK1 to DOCK5 is connected to only one of the user devices USER1 to USER5. However, in practice, each of the docking stations DOCK1 to DOCK5 may have a plurality of expansion slots, and the same docking stations DOCK1 to DOCK5 may be used for some or all of the user devices USER1 to USER5.

The network switch NESW1 is disposed between the docking stations DOCK1 and DOCK2 and the management information device MIS. In addition, the network switches NESW1 and NESW2 are disposed between the user devices USER3 to USER5 and the management information device MIS.

As shown in FIG. 3, before the docking stations DOCK1 to DOCK5 are connected to the management information device MIS, the management information device MIS fails to identify the docking stations DOCK1 to DOCK5 and the user devices USER1 to USER5 connected thereto. At this time, the management information device MIS may receive permission setting request from an external electronic device such as a cloud server. The management information device MIS may preset permission of the user devices USER1 to USER5 or other unpredictable user devices such as temporary visitors which may be connected to the docking stations DOCK1 to DOCK5, according to the permission setting request.

When statuses of users of the user devices USER1 to USER5 are changed or replaced by other users, the management information device MIS may update the user permission database to store new permission of the user devices USER1 to USER5. When new user devices are additionally provided or replace the user devices USER1 to USER5, the management information device MIS may update the user permission database to store the user identification information such as the IP addresses or the MAC addresses of the new user devices and set permission of user identities of the new user devices.

Optionally, an authentication procedure may be provided and used to confirm whether the user identities of the user devices USER1 to USER5 changes. For example, the user devices USER1 to USER5 are respectively connected to the docking stations DOCK1 to DOCK5 through wires, and the docking stations DOCK1 to DOCK5 are wirelessly connected to the management information device MIS. Under this condition, the management information device MIS may request the users of the user devices USER1 to USER5 which are respectively connected to the docking stations DOCK1 to DOCK5 to respond their identity identification information such as names, statuses and other personal information, or identity identification codes that represent the personal information.

The management information device MIS may authenticate the personal information and the identity identification codes to determine permission of the user devices USER1 to USER5. When the management information device MIS determines that the personal information and the identity identification codes of the user devices USER1 to USER5 are different from those previously obtained, the management information device MIS determines the user of the user devices USER1 to USER5 to have been changed or their statuses to have been adjusted. Under this condition, the management information device MIS may update the user identification information of the user devices USER1 to USER5 and set permission for the updated user identification information in the user permission database.

The permission of the user devices USER1 to USER5 may not only depend on the user identity corresponding to the user identification information of the user devices USER1 to USER5, but also depend on docking device information such as positions of the docking stations DOCK1 to DOCK5.

For example, the management information device MIS may store docking identification information of the docking stations DOCK1 to DOCK5 and permission corresponding thereto in the user permission database. When the user devices USER1 to USER5 are connected to the docking stations DOCK1 to DOCK5, the management information device MIS may identify the docking stations DOCK1 to DOCK5 according to the docking identification information. The management information device MIS then determines the permission of the user devices USER1 to USER5, according to the docking identification information of the docking stations DOCK1 to DOCK5 and the user identification information of the user devices USER1 to USER5 connected to the docking stations DOCK1 to DOCK5.

Figure 5:
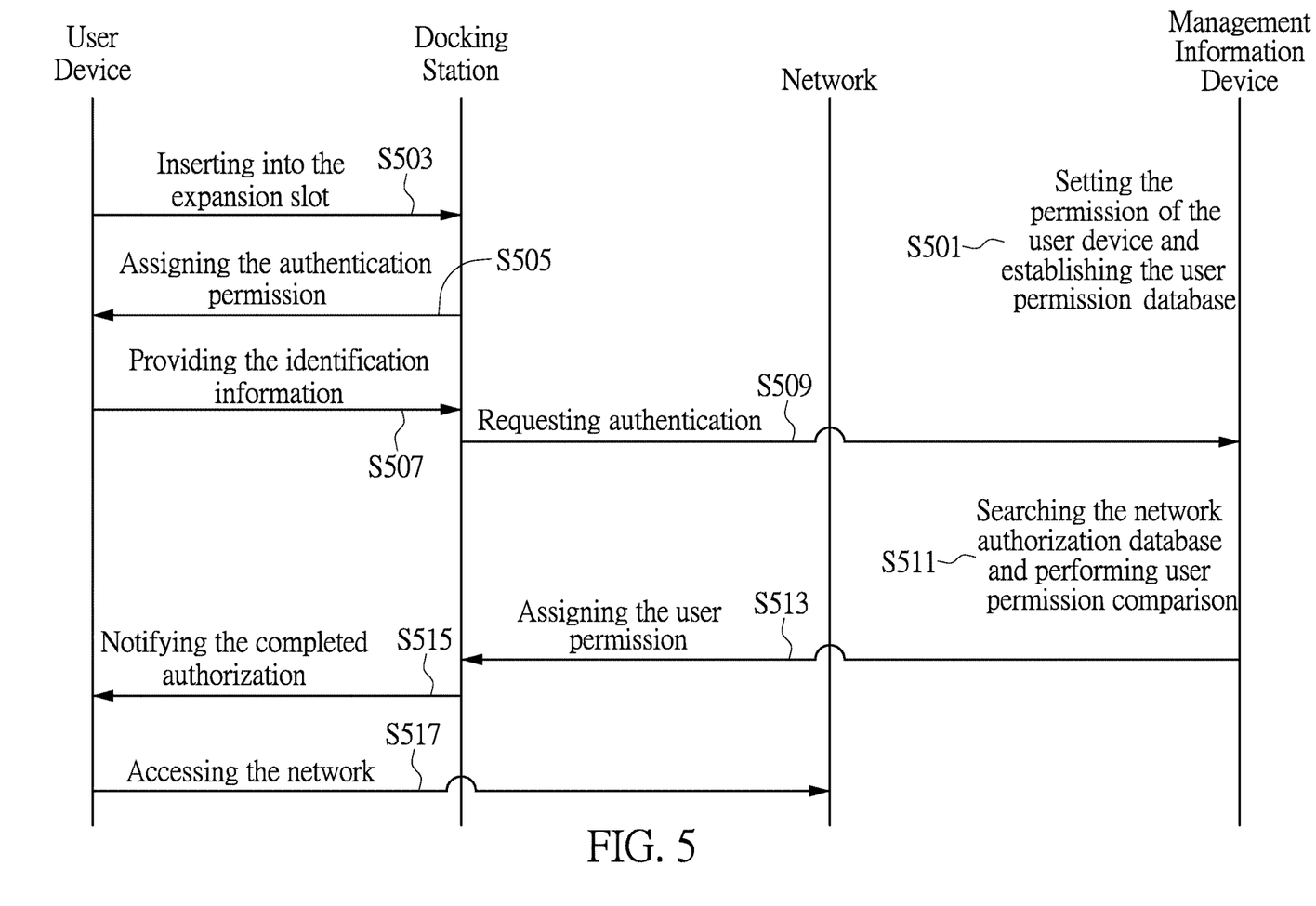
FIG. 5 is a flowchart diagram of a user permission management method according to a third embodiment of the present disclosure.

Reference is made to FIG. 5, which is a flowchart diagram of a user permission management method according to a third embodiment of the present disclosure. As shown in FIG. 5, in the third embodiment, the user permission management method includes the following steps S501 to S517.

In step S501, the management information device may set a network permission of the one or more user devices and establish the user permission database for storing the user identification information of the one or more user devices and the network permission corresponding thereto. It should be understood that the management information device may not only manage network permission, but also manage permission of other resources to the user devices. For example, the management information device may allow a display device to synchronously display screen images of the user devices, but the present disclosure is not limited thereto.

In step S503, the user devices may be selectively connected to any one of the docking stations. For example, it is determined which one of the docking stations the user device is connected to according to a position of the user device. It should be understood that the position of the user device may be changed. Under this condition, a connector may be removed from an expansion slot of one of the docking stations and then inserted into an expansion slot of the other docking station.

In step S505, when the detector module of the docking station detects that the user device is connected to the docking station, a processor module of the docking station may assign authentication permission to the user device and output a user identity authentication request to the user device to request the user device to provide the user identification information thereof.

In step S507, when the user device receives the user identity authentication request, the user device responds to the docking station with the user identification information to request identity authentication.

In step S509, the docking station wirelessly transmits the user identification information of the user device to the management information device through the network to request the management information device to authenticate the user device.

In step S511, the management information device may compare the user identification information from the user device with the user identification information stored in the user permission database, to search the user identity corresponding to the user identification information and the network permission authorized to the user identity by the processor module.

In step S513, when the management information device looks for the network permission authorized to the user identity of the user device in the user permission database, the management information device assigns the network permission to the user device.

In step S515, the docking station notifies the user device that the identity authentication has been completed.

In step S517, the management information device controls the docking station to assign the network permission to the user device to use network resources. For example, the user device is allowed to browse specific webpages and access specified information.

In summary, the present disclosure provides the user permission management system and method, which use the docking stations to connect the user devices to the management information device. The docking station transmits the user identification information of the user device connected thereto to the management information device. The management information device determines whether or not the user identification information from the user device matches with the user identification information stored in the user permission database. If they match each other, the management information device assigns the network permission to the user device to use the network resources according to the user identification information in the user permission database. The management information device effectively manages accessing and using permissions of the network resources for the user devices intending to use the network.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A user permission management system, which is suitable for assigning permission to one or more user devices, the user permission management system comprising:
    a docking station, having an expansion slot and a detector module, wherein the one of the user devices is electrically connected to the docking station through the expansion slot, and the docking station is configured to transmit user identification information provided from the user device, wherein the user identification information includes an IP address or a MAC address of the user device; and
    a management information device connected to the docking station, and configured to:
        store a user permission database,
        search for a user identity corresponding to the user identification information of the user device and permission of the user identity in the user permission database,
        compare the user identification information of the user device with the user identification information stored in the user permission database,
        control the docking station to assign the permission of the user identity to the user device,
        notify the user device that identity authentication completed, and
        authorize the user device to use network resources corresponding to the permission of the user identity;
        wherein the user device is configured to provide the user identification information in response to receiving a user identity authentication request, and the user identity authentication request is output by the docking station in response to the detector module detecting that the user device is electrically connected to the docking station.

2. The user permission management system of claim 1, wherein the management information device determines the permission of the user device according to the user identification information of the user device and docking identification information of the docking station.

3. The user permission management system of claim 1, further comprising:
    a first network switch connected between the management information device and the docking station;
    wherein the first network switch is configured to allow the network resources to be transmitted between the management information device and the docking station through a network.

4. The user permission management system of claim 3, further comprising:
    a second network switch connected between the first network switch and the docking station;
    wherein the first network switch and the second network switch are configured to allow the network resources to be transmitted between the management information device and the docking station through the network.

5. A user permission management method, which is suitable for assigning permission to one or more user devices, the user permission management method comprising the following steps:
    providing a docking station, one of the user devices being electrically connect to the docking station, and transmitting, by the docking station, user identification information provided from the user device connected to the docking station, wherein the docking station has an expansion slot and a detector module, and the user device is electrically connected to the docking station through the expansion slot, and wherein the user identification information includes an IP address or a MAC address of the user device;
    storing a user permission database by a management information device;
    searching for a user identity corresponding to the user identification information and permission of the user identity in the user permission database by the management information device;
    comparing the user identification information of the user device with the user identification information stored in the user permission database;

controlling the docking station, by the management information device, to assign the permission to the user device and to authorize the user device to use network resources corresponding to the permission of the user identity;

notifying the user device that identity authentication completed; and authorizing the user device to use network resources corresponding to the permission of the user identity;

wherein the user device is configured to provide the user identification information in response to receiving a user identity authentication request, and the user identity authentication request is output by the docking station in response to the detector module detecting that the user device is electrically connected to the docking station.

6. The user permission management method of claim 5, further comprising a step of:

determining the permission of the user device according to the user identification information of the user device and docking identification information of the docking station by the management information device.

7. The user permission management method of claim 5, further comprising steps of:

providing a first network switch connected between the management information device and the docking station; and allowing the network resources to be transmitted between the management information device and the docking station through a network by the first network switch.

8. The user permission management method of claim 7, further comprising steps of:

providing a second network switch connected between the first network switch and the docking station; and allowing the network resources to be transmitted between the management information device and the docking station through the network by the first network switch and the second network switch.

\* \* \* \* \*